(12) United States Patent
Yoon et al.

(10) Patent No.: US 8,023,510 B2
(45) Date of Patent: Sep. 20, 2011

(54) METHOD OF MANAGING GROUP OF DYNAMIC MULTICAST EFFICIENTLY

(75) Inventors: Mi Y. Yoon, Seoul (KR); Seung G. Ji, Seoul (KR); Hyun C. Jeong, Seoul (KR); Yoo J. Won, Gyeonggi-do (KR)

(73) Assignee: Korea Information Security Agency, Seoul (KR)

( * ) Notice: Subject to any disclaimer, the term of this patent is extended or adjusted under 35 U.S.C. 154(b) by 308 days.

(21) Appl. No.: 12/464,645

(22) Filed: May 12, 2009

(65) Prior Publication Data
US 2010/0290462 A1 Nov. 18, 2010

(51) Int. Cl.
*H04L 12/28* (2006.01)
(52) U.S. Cl. .......... 370/390; 370/432
(58) Field of Classification Search .......... None
See application file for complete search history.

(56) References Cited

U.S. PATENT DOCUMENTS

| | | | |
|---|---|---|---|
| 2004/0252690 A1* | 12/2004 | Pung et al. | 370/390 |
| 2005/0066020 A1* | 3/2005 | Wechter et al. | 709/223 |
| 2005/0193099 A1* | 9/2005 | Reus et al. | 709/220 |
| 2007/0027889 A1* | 2/2007 | Kaufman | 707/101 |

* cited by examiner

*Primary Examiner* — Chirag G Shah
*Assistant Examiner* — Otis L Thompson, Jr.
(74) *Attorney, Agent, or Firm* — Schwegman, Lundberg & Woessner, P.A.

(57) ABSTRACT

The present invention relates to a method of efficiently managing dynamic multicast groups. In the method of efficiently managing dynamic multicast groups a hierarchical structure is used as a network structure for a multicast service. Accordingly, there are advantages in that groups can be merged or divided efficiently and overload depending on group management can be reduced.

11 Claims, 7 Drawing Sheets

【FIG. 1】
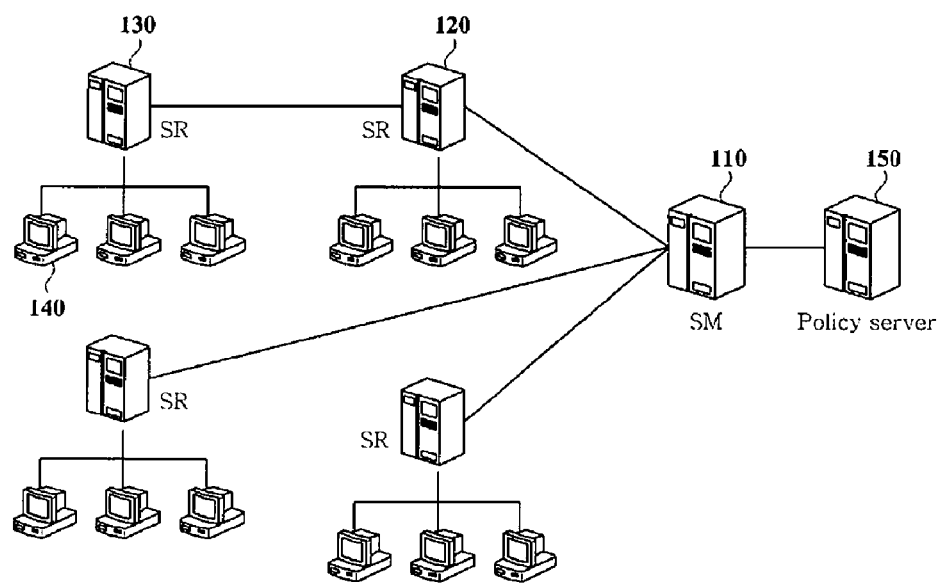

[FIG. 2]
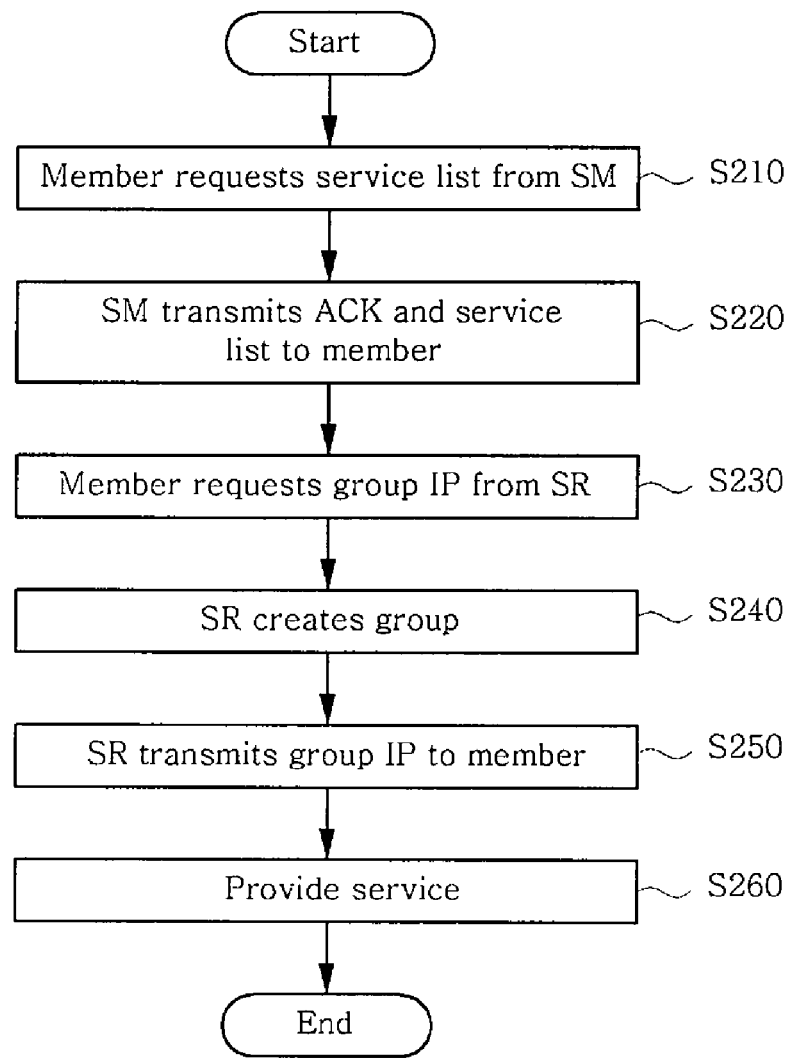

[FIG. 3]
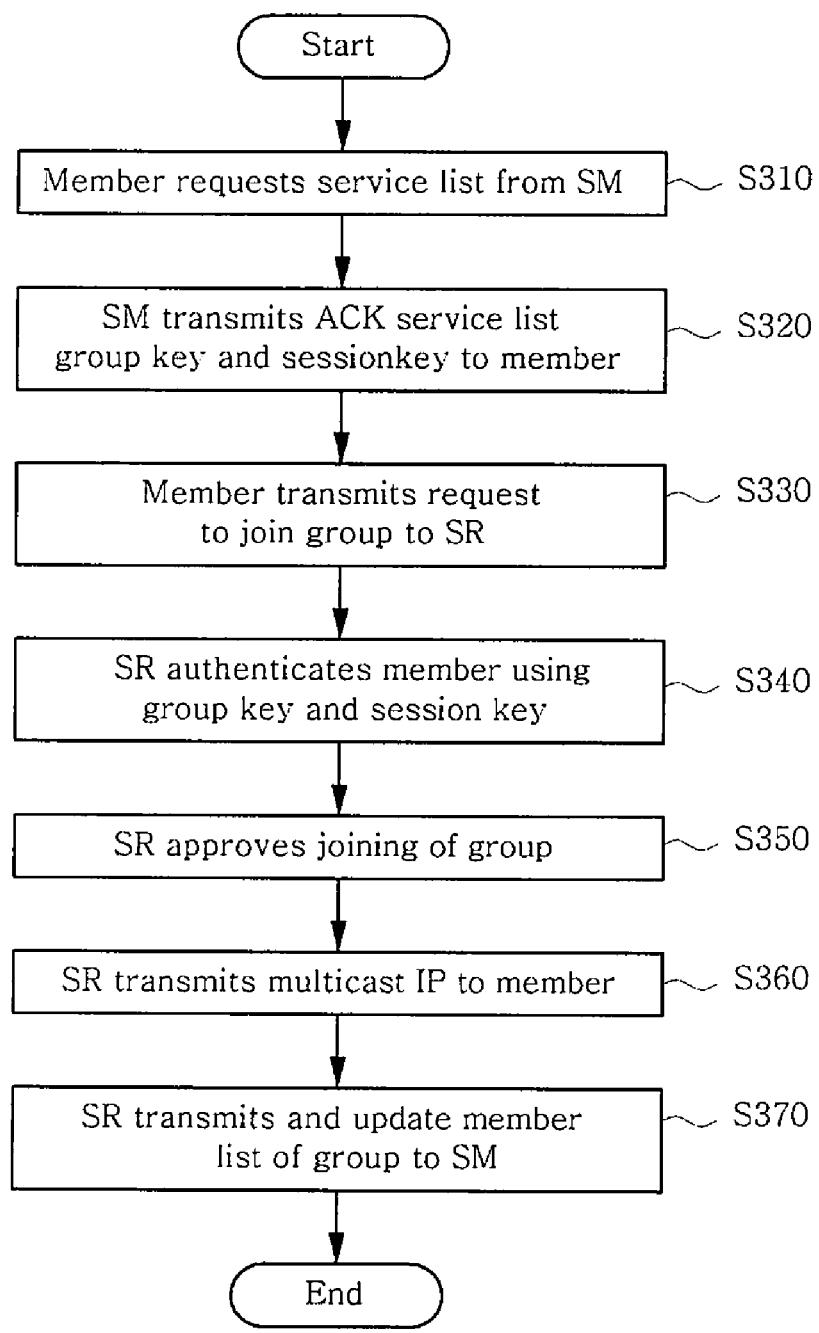

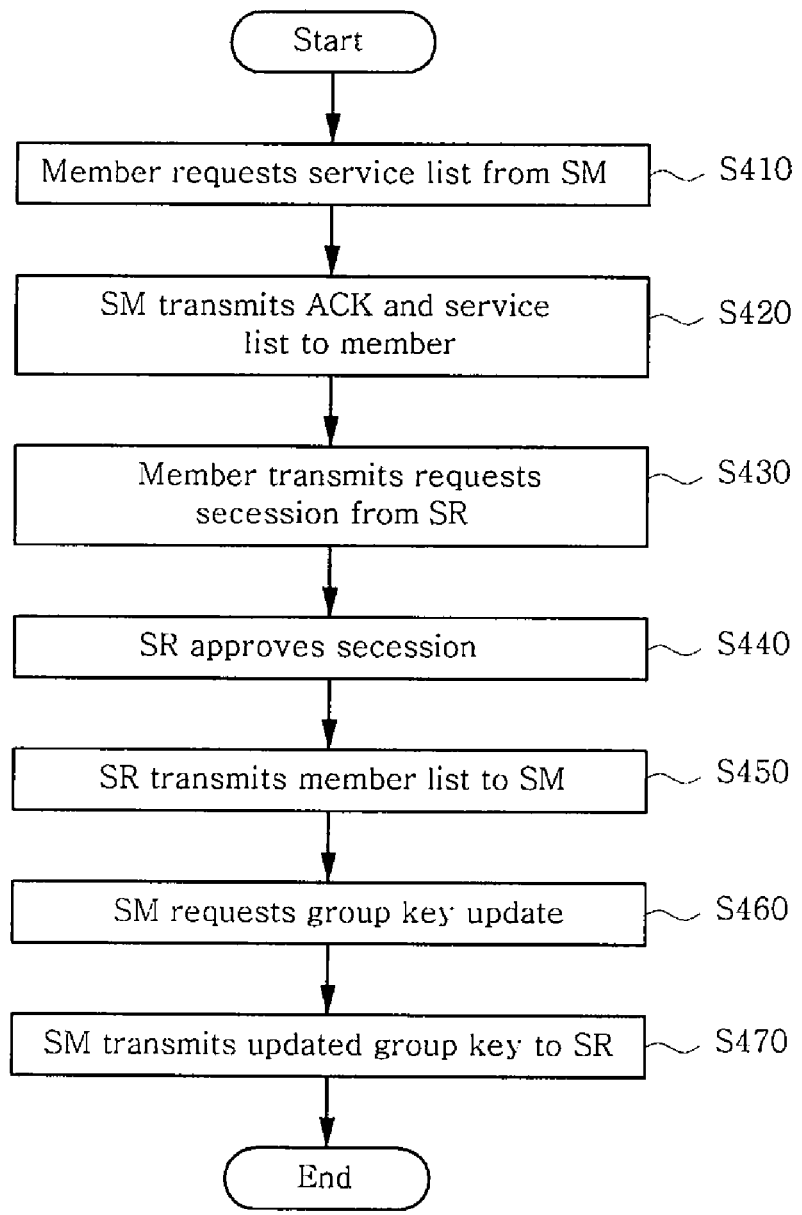

[FIG. 5]
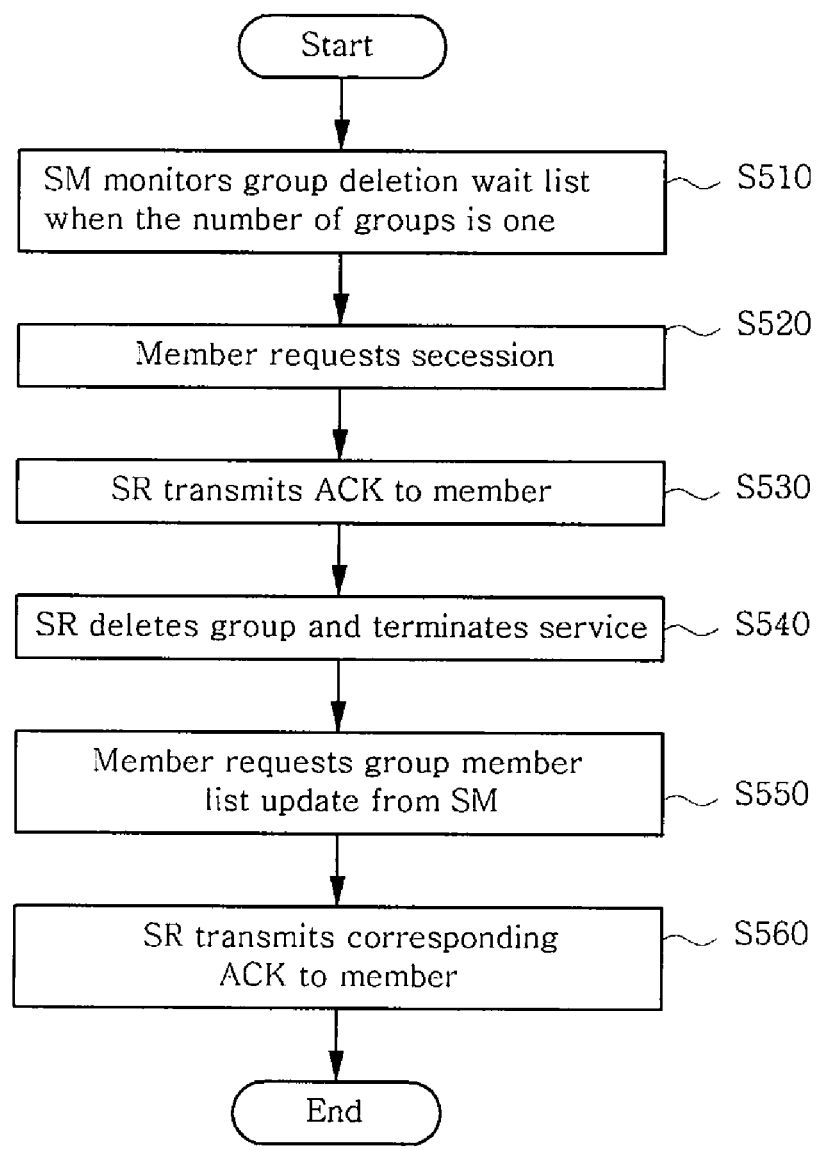

[FIG. 6]
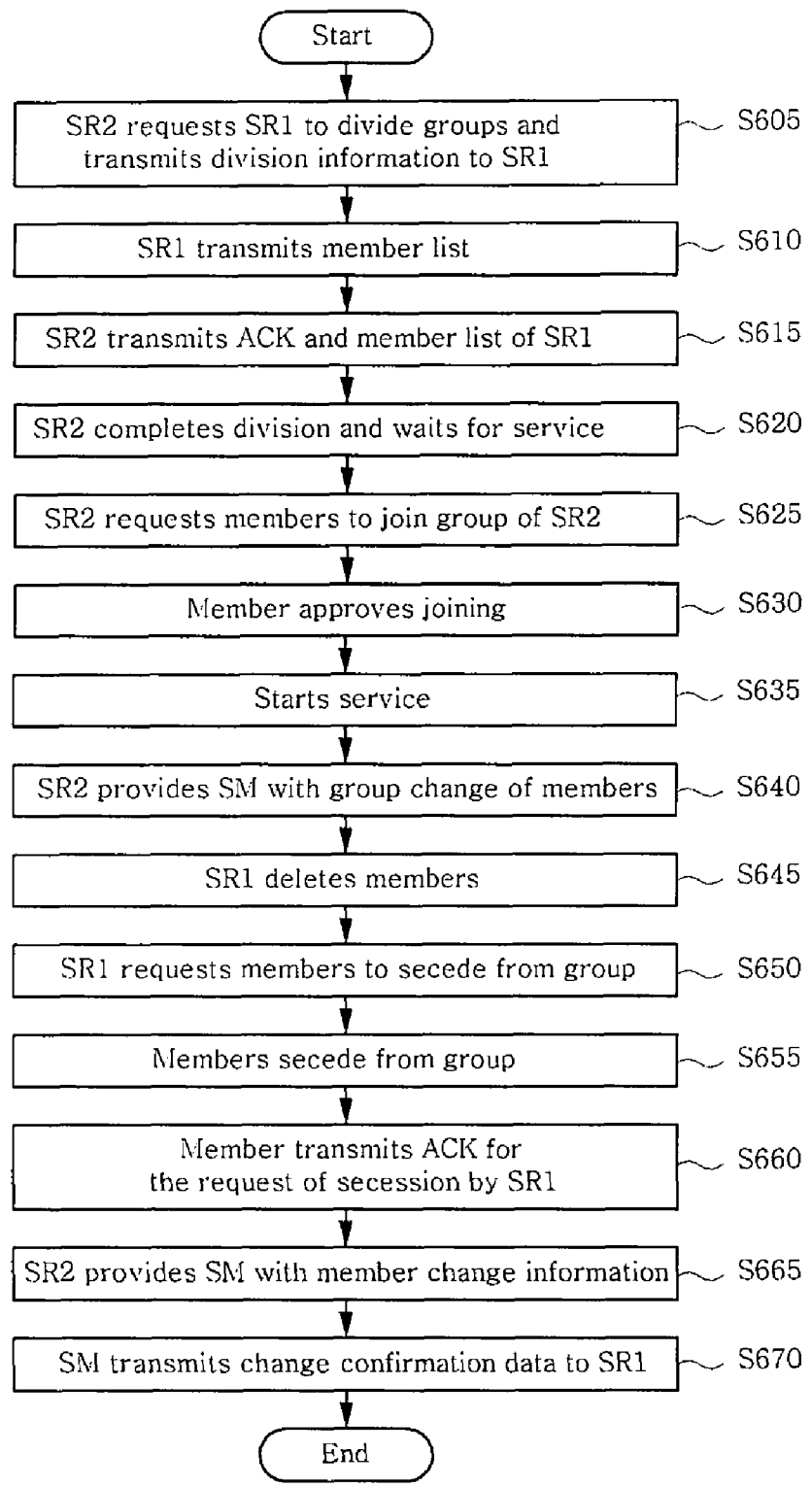

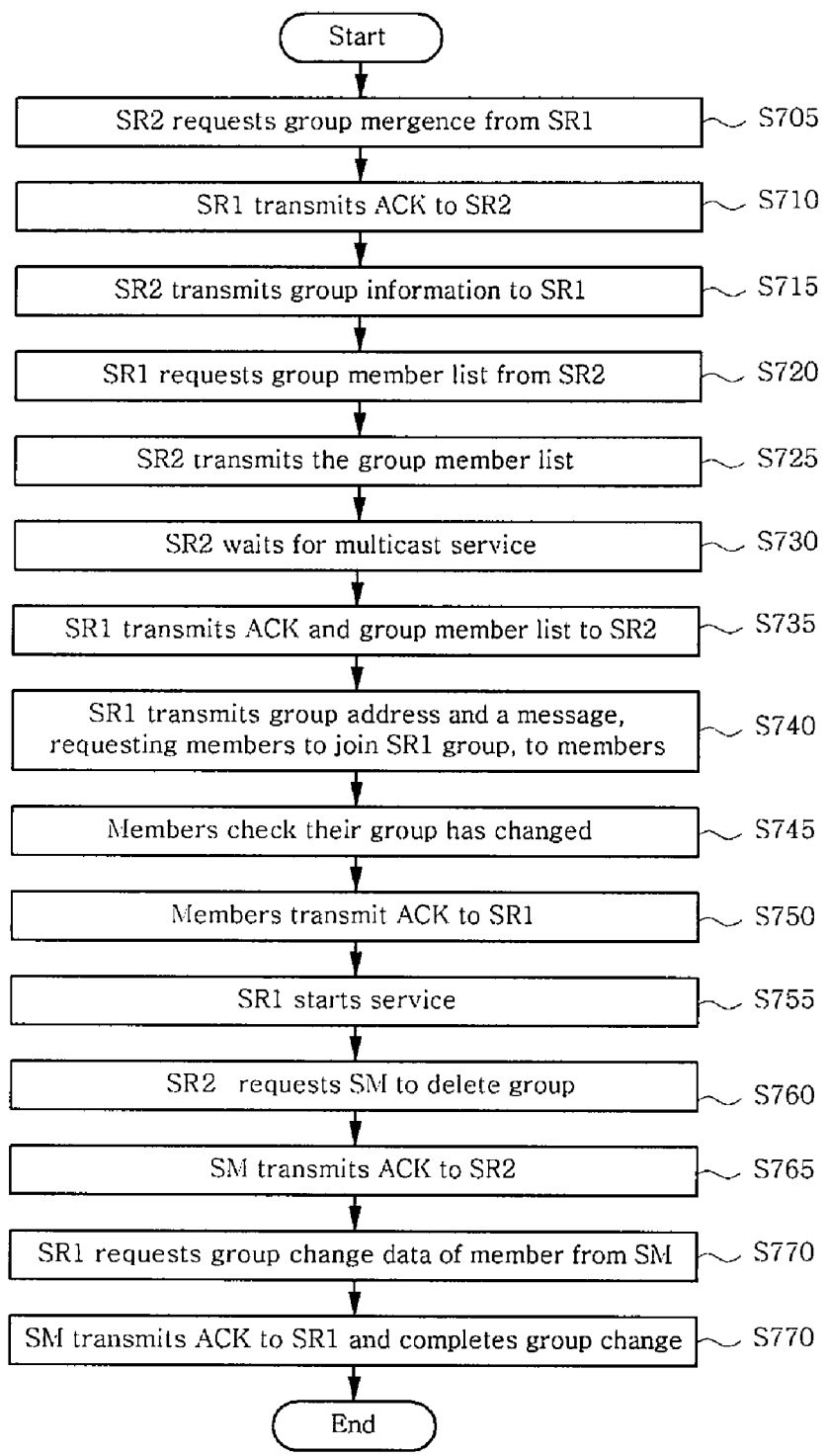
[FIG. 7]

METHOD OF MANAGING GROUP OF DYNAMIC MULTICAST EFFICIENTLY

BACKGROUND OF THE INVENTION

1. Field of the Invention

The present invention relates to a method of efficiently managing dynamic multicast groups, and more particularly, to a method of efficiently managing dynamic multicast groups, which is capable of providing efficient group management, such as the extension or reduction of groups, through a hierarchical structure when multicast service is provided to a specific group in network environment.

2. Background of the Related Art

Multicast schemes have recently been applied to transmit digital information over a public network, such as paid TV, paid video service, and secret teleconference based on the Internet. In multicast communication, a group message is transmitted to all members belonging to a group. In general, in order to control access rights to information in a multicast group, data is encrypted using a group key (a session key). The group key is known to only the members within the group, and only member who know the key can decrypt messages. Multicast communication is excellent in terms of efficiency because messages are transmitted to each of n group members n times, but the messages have only to be sent to all members only once. The multicast communication however requires improvement in the stability of privacy resulting from a change in groups and the efficiency of a key update task because of the addition or deletion of members.

In the prior art, in the case where a new member joins a group or the existing member secedes from a group, problems arise in normal service and in the extension of groups because a group key update has to be frequently performed so as to update a group key and a session key used by members.

SUMMARY OF THE INVENTION

Accordingly, the present invention has been made in view of the above problems occurring in the prior art, and it is an object of the present invention to provide a method of efficiently managing dynamic multicast groups, which is capable of reducing overhead depending on key update resulting from the movement of group members by performing group management for multicast service through a hierarchical structure not a centralized method.

To achieve the above object, a method of efficiently dividing dynamic multicast groups according to an embodiment of the present invention includes a first step of a second management server requesting a first management server to divide a group of the first management server, a second step of the first management server transmitting a list of group members to the second management server, a third step of, when the second management server requests one or more members whose group needs to be changed to join a group of the second management server because of the division of the group, the members approving the joining of the second management server and the second management server starting a multicast service, a fourth step of the second management server notifying a last server and the first management server that the members have been changed, a fifth step of the first management server deleting, from its group, the members whose group has been changed and requesting the members to secede from its group, a sixth step of the members approving the secession from the group of the first management server and transmitting acknowledge data, corresponding to the secession from the group of the first management server, to the first management server, and a seventh step of the last server transmitting contents of the change of the group, received in the fourth step, to the first management server and the second management server.

To achieve the above object, a method of efficiently merging dynamic multicast groups according to an embodiment of the present invention includes a first step of a second management server requesting a first management server to merge a group of the second management server with a group of the first management server, a second step of the first management server requesting a list of group members from the second management server and receiving the list of the group members from the second management server, a third step of the first management server waiting for the multicast service, and transmitting a group address to the group members and, at the same time, requesting the group members to join the group of the first management server, a fourth step of the group members approving the joining of the first management server and the first management server starting a multicast service, a fifth step of the second management server requesting a last server to delete the group of the second management server and the first management server providing contents of a change in the group members resulting from the mergence to the last server, and a sixth step of the last server transmitting acknowledge data for the contents of the change in the group members to the first management server and deleting the group of the second management server.

BRIEF DESCRIPTION OF THE DRAWINGS

Further objects and advantages of the invention can be more fully understood from the following detailed description taken in conjunction with the accompanying drawings in which:

FIG. 1 is a diagram showing a system regarding efficient dynamic multicast groups according to an embodiment of the present invention;

FIG. 2 is a flowchart showing a method of efficiently managing dynamic multicast groups according to an embodiment of the present invention;

FIG. 3 is a flowchart showing a method of efficiently managing dynamic multicast groups according to another embodiment of the present invention;

FIG. 4 is a flowchart showing a method of efficiently managing dynamic multicast groups according to still another embodiment of the present invention;

FIG. 5 is a flowchart showing a method of efficiently managing dynamic multicast groups according to further still another embodiment of the present invention;

FIG. 6 is a flowchart showing a method of efficiently managing dynamic multicast groups according to further still another embodiment of the present invention; and FIG. 7 is a flowchart showing a method of efficiently managing dynamic multicast groups according to further still another embodiment of the present invention.

DETAILED DESCRIPTION OF THE PREFERRED EMBODIMENT

The terms or words used in the specification and the claims are not limited to or should not be construed as being typical or dictionary meanings, but should be construed as meanings and concepts which coincide with the technical spirit of the present invention based on the principle that an inventor may properly define the concepts of the terms in order to describe this invention using the best method.

Accordingly, the constructions shown in the embodiments and the drawings in the specification illustrate only the most preferred embodiments of the present invention and do not represent the entire technical spirit of the present invention. Accordingly, it should be understood that a variety of equivalent arrangements and modifications which may replace the constructions may exist at the time of filing of this application.

Preferred embodiments of the present invention will now be described in detail with reference to the accompanying drawings.

FIG. 1 is a diagram showing a system regarding efficient dynamic multicast groups according to an embodiment of the present invention. Referring to FIG. 1, the system includes a Section Manager (SM) 110, a Secure Relay (SR) 120, a Secure Relay (SR) 130, members 140, and a policy server 150.

The SM 110 is a group initiator and is configured to distribute a security policy, which has been determined and established by the policy server 150, to the SRs 120 and 130 before a session starts. The SM 110 is a last server for managing a total number of groups managed by the SRs 120 and 130. The SM 10 knows information about a change in the groups because, although it does not exchange information with members regarding the extension and reduction of the groups, it knows information about the members. The SM 110 transmits a group key to each of the SRs 120 and 130. When there is a change in the members, each of the SRs 120 and 130 requests a group key update from the SM 110, so it can authenticate the members using the group key and allows the members to receive the data of the groups.

The SR 120 is the sub group of the SM 110 and is a management server for, in the case where groups are divided into neighboring groups within the same domain, managing the groups. The SR 120 includes one or more groups. The SR 120 authenticates members, requesting to join a group, and transmits data, transmitted by the SM 110, to the members of the groups.

The SR 130 is the sub group of the SR 120. In the case where groups are divided because too many members belong to the groups of the SR 120, the members of the SR 120 are divided and managed by the SR 130. The SR 130 is the same management server as the SR 120.

The SR 120 and the SR 130 belong to the same domain and understand information about members and the number of groups by exchanging state information therebetween through communication.

Each of the members 140 is a host which accesses the SR 130 and receives multicast service. Data transmitted by the SR 130 is decrypted and provided to the member 140. The member 140 may include not only a member connected to the SR 130, but also a member connected to another SR.

The member 140 receives a group key and a session key, corresponding to the SR 120 or the SR 130, from the SM 110 and experiences an authentication process through the group key and the session key.

When members are changed, the SRs 120 and 130 update a group key at the request for update by the SM 110. Accordingly, an authentication procedure is performed such that, although the members have a session key, they cannot receive the data of a group if they do not have the updated group key.

The policy server 150 functions to determine the policy of a group with consideration taken of security requirements depending on application characteristics. The policy server 150 determines and establishes a security policy before the SM 110 starts a session and then transmits the security policy to each of the SRs 120 and 130.

The SM 110 transmits data to each of the SR 120 and the SR 130 in unicast. The SM 110 does not need to manage many members in one group because it has a hierarchical structure. Accordingly, the overload of a key update, which is necessary to manage members, can be reduced.

FIG. 2 is a flowchart showing a method of efficiently managing dynamic multicast groups according to an embodiment of the present invention. Referring to FIG. 2, when a logged-in member wants to receive a new multicast service, the member requests a service list from the SM at step S210.

The SM transmits an acknowledge character (hereinafter referred to as 'ACK') and the service list for the new multicast service to the member at step S220. The member who has received the service list requests a group IP for the multicast service from the SR at step S230.

The SR creates a group for the multicast service at step S240 and transmits group IP, corresponding to the group, to the member at step S250. Accordingly, the member can receive the new multicast service at step S260.

FIG. 3 is a flowchart showing a method of efficiently managing dynamic multicast groups according to another embodiment of the present invention. Referring to FIG. 3, a member must join a group in order to receive a multicast service.

In the state where the member is logged in, the member requests a service list from the SM at step S310. The SM transmits ACK and the service list to the member and, at the same time, transmits the group key and the session key of a group that the member tries to join to the member at step S320.

The member sends a request to join the group to the SR at step S330. The SR authenticates the member using the group key and the session key at step S340. If, as a result of the authentication, the member is an authenticated member, the SR approves the joining of the group of the SR at step S350 and transmits a multicast IP address, corresponding to the group, to the member at step S360. The SR transmits the member list of the group to the SM because the members of the group have been changed, so that the SM can update the member list at step S370.

FIG. 4 is a flowchart showing a method of efficiently managing dynamic multicast groups according to still another embodiment of the present invention. FIG. 4 corresponds to a process of a member seceding from a group.

When a logged-in member requests a service list from the SM at step S410, the SM transmits ACK and the corresponding service list to the member at step S420. The member sends a message, requesting to secede from a group which belongs to the received service list, to the SR at step S430. The SR approves the secession of the member from the group at step S440.

The member list of the group has been changed because the member seceded from the group. Accordingly, the SR transmits the changed member list of the group to the SM, so the SM can update the member list at step S450. The SR requests the SM to update a group key because the member list has been changed at step S460. The SM updates the group key of the SR and transmits the updated group key to the SR at step S470.

Although the member who seceded from the group has a session key, the member cannot receive data transmitted to the group because the member does not have the updated group key.

FIG. 5 is a flowchart showing a method of efficiently managing dynamic multicast groups according to further still another embodiment of the present invention. FIG. 5 corresponds to a process of deleting a group when there are no more members in the group because a multicast service has been terminated.

In the case where the number of group members is determined to be 1, the SM monitors a group deletion wait list in order to list or delete the member at step S510. If the member requests to secede from the group at step S520, the SR transmits ACK to the member in response to the request at step S530.

The SR deletes the group in which the member does not exist and terminates a multicast service at step S540. The member requests the SM to update the list of group members at step S550. The SM updates the list of the group members and transmits data (ACK), corresponding to the update, to the member at step S560, so the member can know the status of the group and the conditions of the members.

FIG. 6 is a flowchart showing a method of efficiently managing dynamic multicast groups according to further still another embodiment of the present invention. FIG. 6 corresponds to a process of, when overhead occurs in an SR1, a neighboring SR2 within the same domain dividing group members. Here, the SR1 and the SR2 provide the same service.

It is assumed that the SM, the SR1, and the SR2 communicate with each other and exchange state information therebetween, and a multicast service is synchronized.

When the number of groups of the SR1 is greater than a reference, the SR2 requests the SR1 to divide the groups and, at the same time, transmits its division information to the SR1 at step S605. The SR1 transmits a list of group members to the SR2 at step S610. The SR2 transmits ACK and the list of the group members, received from the SR1, back to the SR1 at step S615. The division information of the SR2 may include the current state of the SR2, the remaining number of members in which members from the SR1 can be included, and so on.

When the groups are divided, the SR2 waits for a multicast service at step S620. The SR2 then transmits a group address to the members so that the members can change their group to the group of the SR2 at step S625. If the members approve joining of the group at step S630, the SR2 starts the multicast service at step S635. The joining process of the group is performed as in FIG. 3.

The SR2 informs the SM and the SR1 that the group of the members has been changed at step S640. The SR1 deletes the members whose group has been changed from the list of its group members because the group of its members has changed to the group of the SR2 at step S645 and then requests the members to secede from the group of the SR1 at step S650. The secession process of the group is performed as in FIG. 4.

The members secede from the group of the SR1 at step S655 and transmit ACK, corresponding to the secession request received from the SR1, to the SR1 at step S660. The SR2 transmits information about the change of the members to the SM at step S665. The SM transmits data, confirming the change of the members, to the SR1 at step S670, so the SM can know that the group of the SR1 has been changed to the group of the SR2.

A criterion for dividing the number of groups is as follows. Assuming that a maximum number of groups that can be managed by an SR is M and a maximum number of groups that are permitted by the SR is K, the number of members of one group is set not to exceed M/K. If the number of members of one group exceeds M/K, the corresponding group is divided.

FIG. 7 is a flowchart showing a method of efficiently managing dynamic multicast groups according to further still another embodiment of the present invention. FIG. 7 corresponds to a process of, when the use rate of an SR2 group is lower than a certain level, merging groups. Here, the SR1 and the SR2 provide the same service.

If the use rate of the SR2 group is lower than a certain level, the SR2 requests the SR1 to merge the group of the SR2 with the group of the SR1 at step S705. The SR1 transmits ACK to the SR2 in response to the request at step S710. The SR2 transmits information about the group to the SR1 at step S715. The SR1 requests a list of group members from the SR2 at step S720. The SR2 transmits the list of members, belonging to its group, but must be moved to the SR1 because of the mergence, to the SR1 at step S725.

After the members of the SR2 group are registered with the group of the SR1, the SR2 waits for a multicast service at step S730. The SR1 transmits ACK for the list of the members, received from the SR2, and the received list of the members to the SR2, thus checking the received list of the members at step S735.

The SR1 transmits a group address and a message, requesting the members whose group has been changed to join the SR1 group, to the members at step S740. The members confirm that their group has changed from the SR2 to the SR1 at step S745 and transmit ACK to the SR1 in response to the group joining request at step S750. The joining process of the group is performed as in FIG. 3.

After the members have joined the SR1, the SR1 starts a multicast service at step S755. The SR2 transmits to the SM a request to delete the corresponding group because its members have been merged with the members of the SR1 at step S760. The SM transmits ACK, approving the deletion of the group, to the SR2 at step S765. The SR1 requests the SM to change its group members because the members of the SR1 have been changed at step S770. The SM receives the contents of the change in the group members of the SR1 and then transmits ACK to the SR1 in response thereto. Accordingly, the change of the group is completed at step S775.

If the use rate of an SR group is lower than a certain level, the SR group is merged. Here, assuming that a maximum number of members which can be managed by the SR is M and the number of members which are currently provided with service by the SR is S, the certain level is calculated by the use rate of a group, $T=S/M*100$. When the use rate of a group is lower than T, a group mergence process is performed.

As described above, in the method of efficiently managing dynamic multicast groups according to the present invention, a hierarchical structure is used as a network structure for a multicast service. Accordingly, there are advantages in that groups can be merged or divided efficiently and overload depending on group management can be reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:
1. A method of efficiently dividing dynamic multicast groups, comprising:
    a first step of a second management server requesting a first management server to divide a group of the first management server;
    a second step of the first management server transmitting a list of group members to the second management server;

a third step of, when the second management server requests one or more members whose group needs to be changed to join a group of the second management server because of the division of the group, the members approving the joining of the second management server and the second management server starting a multicast service;

a fourth step of the second management server notifying a last server and the first management server that the members have been changed;

a fifth step of the first management server deleting, from its group, the members whose group has been changed and requesting the members to secede from its group;

a sixth step of the members approving the secession from the group of the first management server and transmitting acknowledge data, corresponding to the secession from the group of the first management server, to the first management server; and a seventh step of the last server transmitting contents of the change of the group, received in the fourth step, to the first management server and the second management server.

2. The method as claimed in claim 1, wherein the last server manages members of the first management server and the second management server.

3. The method as claimed in claim 1, wherein:
the first management server, the second management server, and the last server exchange state information therebetween through communication, and
the multicast service is synchronized.

4. The method as claimed in claim 1, wherein the division of the group requested in the first step is performed when M/K is exceed, wherein the M is a maximum number of members which are managed by the first or second management server and the K is a number of members which are managed by the first or second management server.

5. The method as claimed in claim 1, wherein the group joining process of the third step comprises:
a first process of the members receiving a group key and a session key from the last server in order to receive the multicast service;
a second process of the second management server authenticating the members using the group key and the session key; and
a third process of the second management server transmitting a group IP to the members.

6. The method as claimed in claim 1, further comprising the step of, when the members secede from the group in the sixth step, the first management server requesting a group key update from the last server and receiving an updated group key from the last server in response to the request.

7. A method of efficiently merging dynamic multicast groups, comprising:

a first step of a second management server requesting a first management server to merge a group of the second management server with a group of the first management server;

a second step of the first management server requesting a list of group members from the second management server and receiving the list of the group members from the second management server;

a third step of the first management server waiting for a multicast service, and transmitting a group address to the group members and, at the same time, requesting the group members to join the group of the first management server;

a fourth step of the group members approving the joining of the first management server and the first management server starting the multicast service;

a fifth step of the second management server requesting a last server to delete the group of the second management server and the first management server providing the last server with contents of a change in the group members resulting from the mergence; and a sixth step of the last server transmitting acknowledge data for the contents of the change in the group members to the first management server and deleting the group of the second management server.

8. The method as claimed in claim 7, wherein the mergence of the group requested in the first step is performed when a use rate of a group is smaller than S/M*100, wherein the S is a number of members which are being provided with service by the first or second management server and the M is a maximum number of members which are managed by the first or second management server.

9. The method as claimed in claim 7, wherein the group joining process of the fourth step comprises:
a first process of the members receiving a group key and a session key from the last server in order to receive the multicast service;
a second process of the second management server authenticating the members using the group key and the session key; and
a third process of the second management server transmitting a group IP to the members.

10. The method as claimed in claim 7, further comprising the step of, when, in the sixth step, there is a change in the members because of the mergence of the group of the second management server with the group of the first management server, the first management server requesting a group key update from the last server and receiving an updated group key from the last server in response to the request.

11. The method as claimed in claim 7, wherein:
the first management server, the second management server, and the last server exchange state information therebetween through communication, and
the multicast service is synchronized.

* * * * *